(12) United States Patent
Jander et al.

(10) Patent No.: US 6,189,062 B1
(45) Date of Patent: Feb. 13, 2001

(54) APPARATUS AND METHOD FOR ADDRESS TRANSLATION IN BUS BRIDGE DEVICES

(75) Inventors: Mark J. Jander; Richard L. Solomon, both of Colorado Springs, CO (US)

(73) Assignee: LSI Logic Corporation, Milpitas, CA (US)

(*) Notice: Under 35 U.S.C. 154(b), the term of this patent shall be extended for 0 days.

(21) Appl. No.: 09/211,465

(22) Filed: Dec. 14, 1998

Related U.S. Application Data

(63) Continuation of application No. 08/707,935, filed on Sep. 10, 1996, now Pat. No. 5,857,080.

(51) Int. Cl.[7] ............................. G06F 12/10; G06F 13/00; G11C 8/00
(52) U.S. Cl. .................... 710/129; 710/127; 711/220; 370/402
(58) Field of Search ..................................... 710/127, 128, 710/129, 101, 3; 711/200, 220, 206, 208; 370/401, 402; 340/825.52; 709/238

(56) References Cited

U.S. PATENT DOCUMENTS

| | | | |
|---|---|---|---|
| 4,356,549 | 10/1982 | Chueh ................................. | 364/200 |
| 4,615,006 | 9/1986 | Hirano ................................ | 364/200 |
| 4,683,534 | 7/1987 | Tietjen et al. ...................... | 364/200 |
| 4,799,187 | 1/1989 | Einarson et al. ................... | 364/900 |
| 4,855,905 | 8/1989 | Estrada et al. ..................... | 364/200 |
| 4,878,166 | * 10/1989 | Johnson et al. . | |
| 4,933,938 | 6/1990 | Sheehy .............................. | 370/85.13 |
| 5,101,339 | 3/1992 | Fairman et al. .................... | 395/400 |
| 5,109,332 | 4/1992 | Culley ................................ | 395/325 |
| 5,299,322 | 3/1994 | Arai et al. .......................... | 395/275 |
| 5,388,227 | 2/1995 | McFarland ......................... | 395/325 |
| 5,390,173 | 2/1995 | Spinney et al. ...................... | 370/60 |
| 5,448,521 | 9/1995 | Curry et al. ................... | 365/189.02 |
| 5,448,703 | 9/1995 | Amini et al. ....................... | 395/290 |
| 5,497,469 | 3/1996 | Sakata et al. ..................... | 395/413 |
| 5,584,005 | 12/1996 | Miyaoku et al. ................... | 395/416 |
| 5,592,631 | 1/1997 | Kelly et al. ........................ | 395/293 |
| 5,611,054 | 3/1997 | Lent et al. .......................... | 395/280 |
| 5,617,554 | 4/1997 | Alpert et al. ...................... | 395/418 |
| 5,649,141 | 7/1997 | Yamazaki ........................... | 395/416 |
| 5,857,080 | * 1/1999 | Jander et al. . | |

FOREIGN PATENT DOCUMENTS

| | | | |
|---|---|---|---|
| 2290640 | 1/1996 | (GB) ............................. | G06F/12/06 |
| 9617304 | 6/1996 | (WO) ............................ | G06F/13/40 |

OTHER PUBLICATIONS

IBM Technical Disclosure Bulletin; Bus Size Independent Architecture; vol. 28, No. 8, Jan., 1986; pp. 3579–3581.

* cited by examiner

Primary Examiner—Gopal C. Ray

(57) ABSTRACT

A bridge translates addresses between a first bus and a second bus, with a larger address space capability. The bridge stores "high address" information and combines that information with address information from a device on the first bus when the device desires to transfer information from the first bus to the second bus. The bridge accesses high address information using information identifying the device.

38 Claims, 4 Drawing Sheets

APPARATUS AND METHOD FOR ADDRESS TRANSLATION IN BUS BRIDGE DEVICES

This is a Continuation of application Ser. No. 08/707,935, filed Sep. 10, 1996, U.S. Pat. No. 5,857,080.

I. BACKGROUND OF THE INVENTION

A. Field of the Invention

The present invention relates generally to address translation, and in particular to apparatus and methods for address translation for communications handled by a bus bridge.

B. Description of the Prior Art

Computer architecture is constantly changing with technological advances and developments of new techniques. As certain elements of computer architecture change, other elements must be adjusted in some manner to compensate for these changes. Sometimes adjustments are made in hardware, sometimes in software, and sometimes in both.

One consistent change in computer architecture has been longer bit-lengths to perform various aspects of processing. Most recently, some architectures have utilized 64-bit lengths for addressing and information transfer. With the advent of 64-bit architectures comes the problem of compatibility between existing 32-bit elements and new 64-bit elements. For example, it is often necessary to transfer information between a 32-bit bus and a 64-bit bus.

When compatibility must be maintained between elements of an architecture, an intermediary device, like a bridge between buses, can adjust incompatibilities between devices. In addition to handling incompatibility issues between devices on each bus, or between the buses, a bridge transfers information. A bridge is frequently used to transfer information between buses and monitors each bus for information intended for the other bus. Upon detecting information on one bus intended for the other bus, the bridge captures the information and takes steps necessary to transfer the information to the destination device or bus. For example, if the elements have different data transfer rates, an intermediary device could perform buffering between the elements in one or both directions to alleviate the rate incompatibility.

For example, a bridge often connects the Peripheral Component Interface (PCI) Local Bus, offering multiplexed address and data lines, and which is a bus architecture designed to form a high-performance, industry standard computer. Details of the PCI Local Bus can be found in The PCI Local Bus 2.1 Specification, which is hereby incorporated by reference as background information.

The PCI has achieved a great deal of popularity with server machines having greater than four gigabytes (GB) of RAM. For such machines, PCI devices should be locatable (i.e., have addresses) above the first 32 bits (4 GB) of address space to avoid conflicts with RAM addresses. The PCI Local Bus 2.1 specification allows this through the use of 64-bit Dual Address Cycles, although the bus does not require support of those cycles. Consequently, pre-2.1 devices and most existing "2.1 compliant" devices cannot support addressing above 4 GB.

Current PCI Bridge devices provide 64-bit to 32-bit address translation in the "downstream" (primary to secondary bus) direction only. This allows 32-bit-only PCI slave devices on the secondary bus to be located arbitrarily within the full 64-bit address space of the primary bus. The 32-bit-only PCI master devices on the secondary bus, however, are confined to addressing only the first 32 bits (4 GB) of the primary bus.

There is a need for apparatus and methods for transferring information between computer elements that address issues of data transfer address width incompatibility.

II. SUMMARY OF THE INVENTION

The present invention relates to apparatus and methods for handling incompatibility issues between elements of a computer architecture. In particular, the invention relates to handling information transfer address width incompatibilities between elements of a system.

The apparatus and methods in accordance with the present invention translate an address used in communication from devices having a first addressing capability to devices having a second addressing capability greater than or equal to the first addressing capability. The invention comprises means for prestoring address translation information accessible by device identification information, means for accessing prestored address translation information using device identification information identifying one of said devices having a first addressing capability, means for receiving first address information from said one device, and means for creating a final address by combining said first address information with said prestored address translation information.

To achieve the objects and in accordance with the purpose of the invention, as embodied and broadly described herein, the invention comprises apparatus and methods for creating an address associated with a communication between a first entity and a second entity. The apparatus and methods defined herein perform such address creation by receiving a first address information from said first entity, accessing prestored address information associated with said first entity, forming a final address by combining said first address information with said prestored address information, and communicating information to said second entity using said final address.

The disclosed invention provides a flexible structure for creating addresses used in transferring information. By utilizing page registers, the upper bits of an address can be developed prior to a transfer occurring. Then, when a device obtains the bus and begins transferring information to an entity on another bus, the upper bits are accessed and used in the transfer of information to the other bus.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

III. BRIEF DESCRIPTION OF THE DRAWINGS

IV. DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
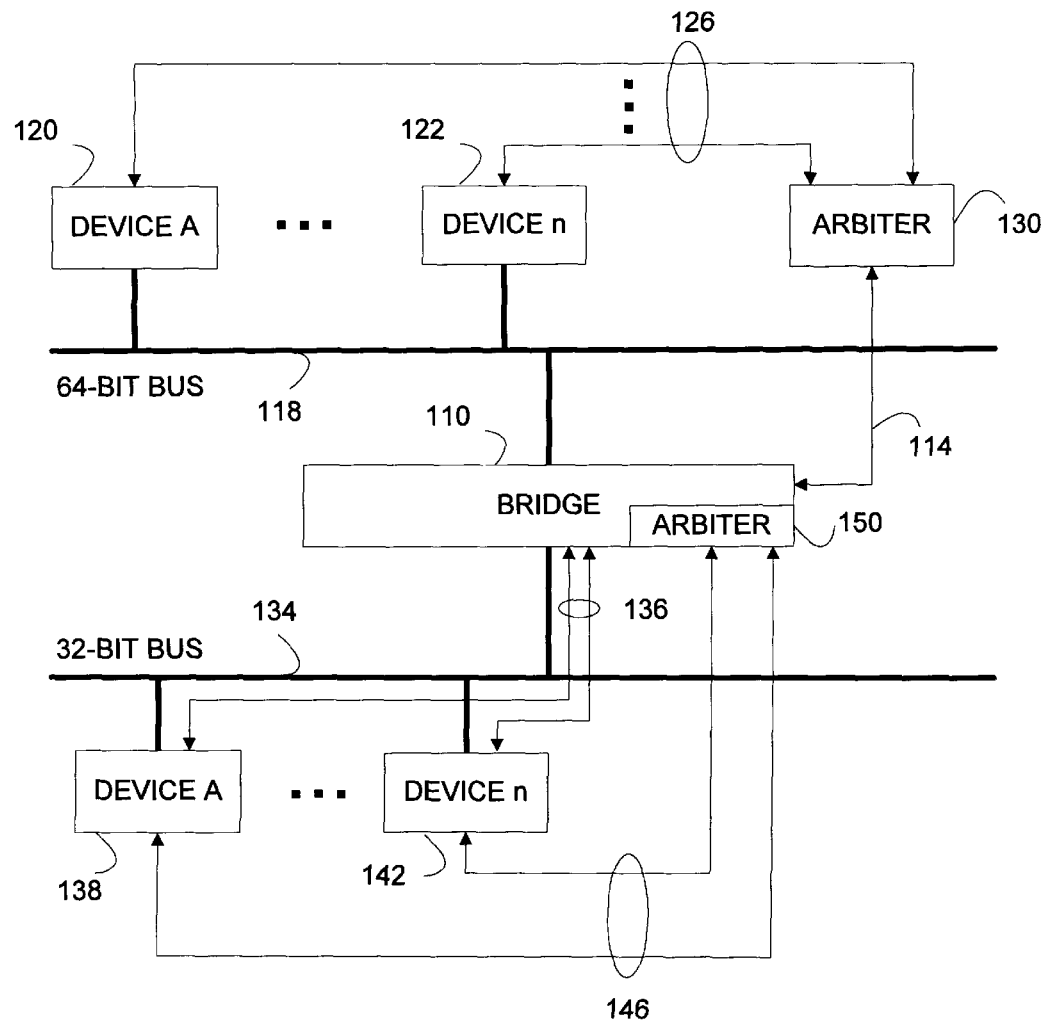
FIG. 1 is a block diagram showing a two-bus architecture having a bridge interconnecting the buses.

FIG. 1 is a block diagram showing an architecture having a bridge interconnecting two buses. Bridge 110 provides a communication path between 64-bit bus 118 and 32-bit bus 134. Upon detecting a communication on one bus intended for the other bus, bridge 110 buffers the communication and arbitrates for access to the other bus by sending bus request signals over either bus 114 to arbiter 130 or to internal arbiter 150.

For example, when bridge 110 detects a communication on bus 118 intended for bus 134, bridge 110 buffers the communication from 64-bit bus 118 and begins arbitrating for 32-bit bus 134. Bridge 110 handles arbitration for bus 134 using internal arbiter 150. When arbiter 150 grants bridge 110 access to the 32-bit bus 134, bridge 110 transfers the buffered communication over bus 134 to the appropriate destination device 138–142. Bridge 110 then releases bus 134. A similar process occurs for communications flowing from 32-bit bus 134 to 64-bit bus 118, with the exception that arbitration is handled by external arbiter 130.

Bridge 110 is also connected to devices 138–142 by buses 136 and 146. Buses 146 handle bus request and bus grant signals for bus 134. Although buses 146 are shown in FIG. 1 as bidirectional, the buses may be implemented in any manner capable of conveying bus request and grant signals. For example, buses 146 may be implemented as a dedicated bus request line, and a dedicated bus grant line. Buses 136 are dedicated lines for transferring auxiliary information between devices 138–142 and bridge 110. The auxiliary information may be used by bridge 110 in a variety of ways in the address translation process, as outlined in further detail below. For example, in a PCI local bus architecture, these lines carry signals referred to as "sideband signals."

A "sideband signal" is defined by PCI Local Bus Specification 2.1 as "Any signal not part of the PCI specification that connects two or more PCI-compliant agents, and has meaning only to those agents." For example, sideband signals may be used to transmit state information between two devices to assist in the interaction between the components. Sideband signals allow for product-specific enhancements, as long as the signals used do not conflict with the PCI Specification.

The 64-bit bus 118 provides a communication path among devices 120–122, and bridge 110. Devices 120–122 and bridge 110 are connected to arbiter 130 via buses 126 and 114, respectively. Arbiter 130 receives bus requests from devices 120–122 and bridge 110, and provides bus grants according to an appropriate arbitration scheme.

32-bit bus 134 provides a communication path among devices 138–142, and bridge 110. Arbiter 150 receives bus requests from devices 138–142 and bridge 110, and provides bus grants according to an appropriate arbitration scheme.

Although two or more devices are shown on each bus in FIG. 1, a bus could have only a single device. For example, bus 118 could have only device 120.

The present invention implements architectures and methods whereby a bridge device allows 32-bit-only devices on a secondary bus to address the full 64-bit address space on a primary bus. For example, the present invention allows a 32-bit-only PCI master device on a secondary bus to address the full 64-bit address space on a primary bus (i.e., "upstream" address translation). This enables use of 32-bit-only PCI devices to be used in systems requiring support of 64-bit addressing, such as the NCR 8-CPU/8 GB RAM servers.

Figure 2:
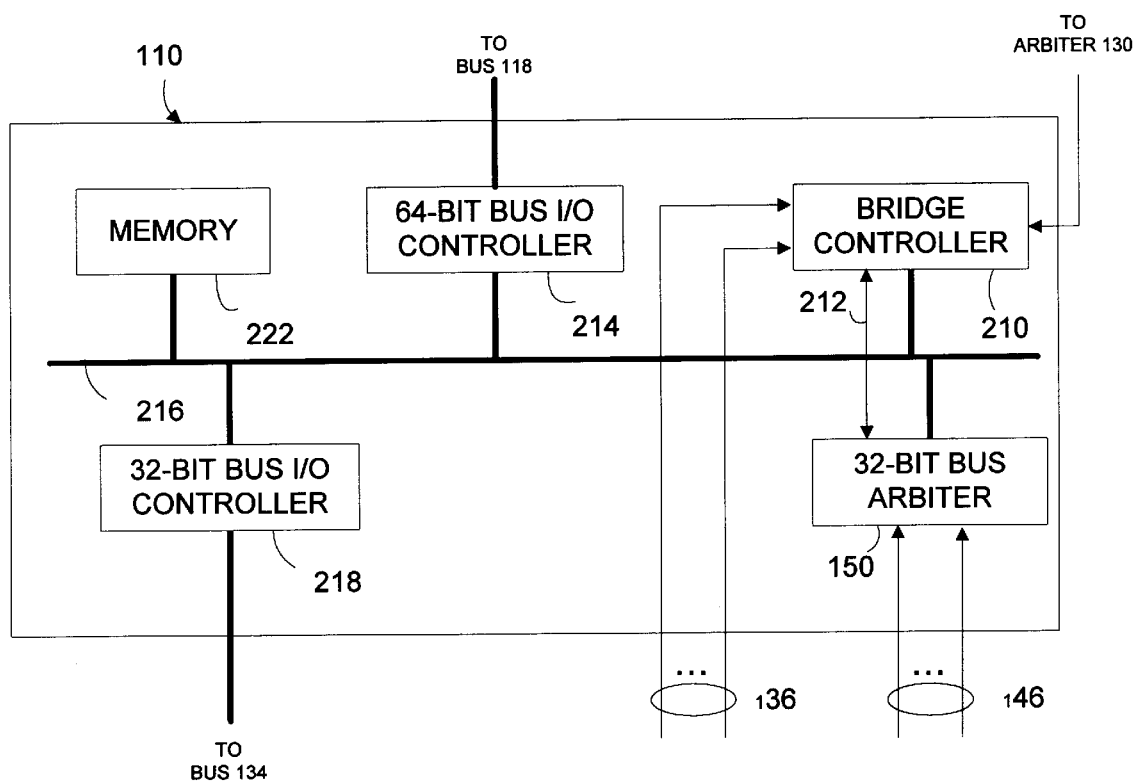
FIG. 2 is a block diagram illustrating a bridge which may be used in accordance with the present invention.

FIG. 2 is a detailed block diagram of bridge 110. Bridge 110 is controlled by bridge controller 210 which interacts with the other elements of the bridge over bus 216. The bridge interacts with 64-bit bus 118 by using 64-bit bus I/O controller 214, and with bus 134 with 32-bit bus I/O controller 218. Internal bus arbiter 150, via buses 146, receives bus requests from, and provides bus grants to, the devices connected to 32-bit bus. Arbiter 150 also handles bus requests from bridge controller 210 via bus 212.

Sideband signal buses 136 allow auxiliary information to be sent between devices 138–142 and bridge controller 210. Sideband signal lines 136 are optional, however, and should be used only if necessary for providing signals beyond the capabilities of buses 134 and 146. In one preferred embodiment, sideband signal lines 136 are used by devices 138–142 to select which of several page registers associated with a device will be used in a data transfer. Bridge controller 210 receives the page register selection information and accesses a particular page register in accordance with the selection information.

The bridge also utilizes memory 222 for storing management data, processing programs, and data being buffered between the buses. Memory 222 may also be used to store the information necessary to implement particular architectural features, such as the PCI Specification discussed above. Each of the bus I/O controllers, the bridge controller, and the 32-bit bus arbiter may have their own internal memory to be used during the normal course of processing. Bridge controller 210 is also connected to arbiter 130 for requesting access to bus 118.

Bridge controller 210 is the primary coordinator of the elements connected to bus 216, because it directs bus I/O controllers 214 and 218 to send and receive information between buses 118, 134 and memory 222. Bridge controller 210 is preferably implemented as a general purpose processor, such as a microprocessor, but could also be implemented as a state machine. Bridge 110 utilizes REQ pin select inputs for buses 146. Upon determining which of the devices on the bus wins the arbitration, an indication is sent to bridge controller 210 via bus 216. Bridge controller 210 utilizes this information, as well as information from buses 136 (if implemented), to develop upstream address translation for allowing a device on bus 134 to utilize the entire 64-bit addressing space of upstream bus 118.

Figure 3:
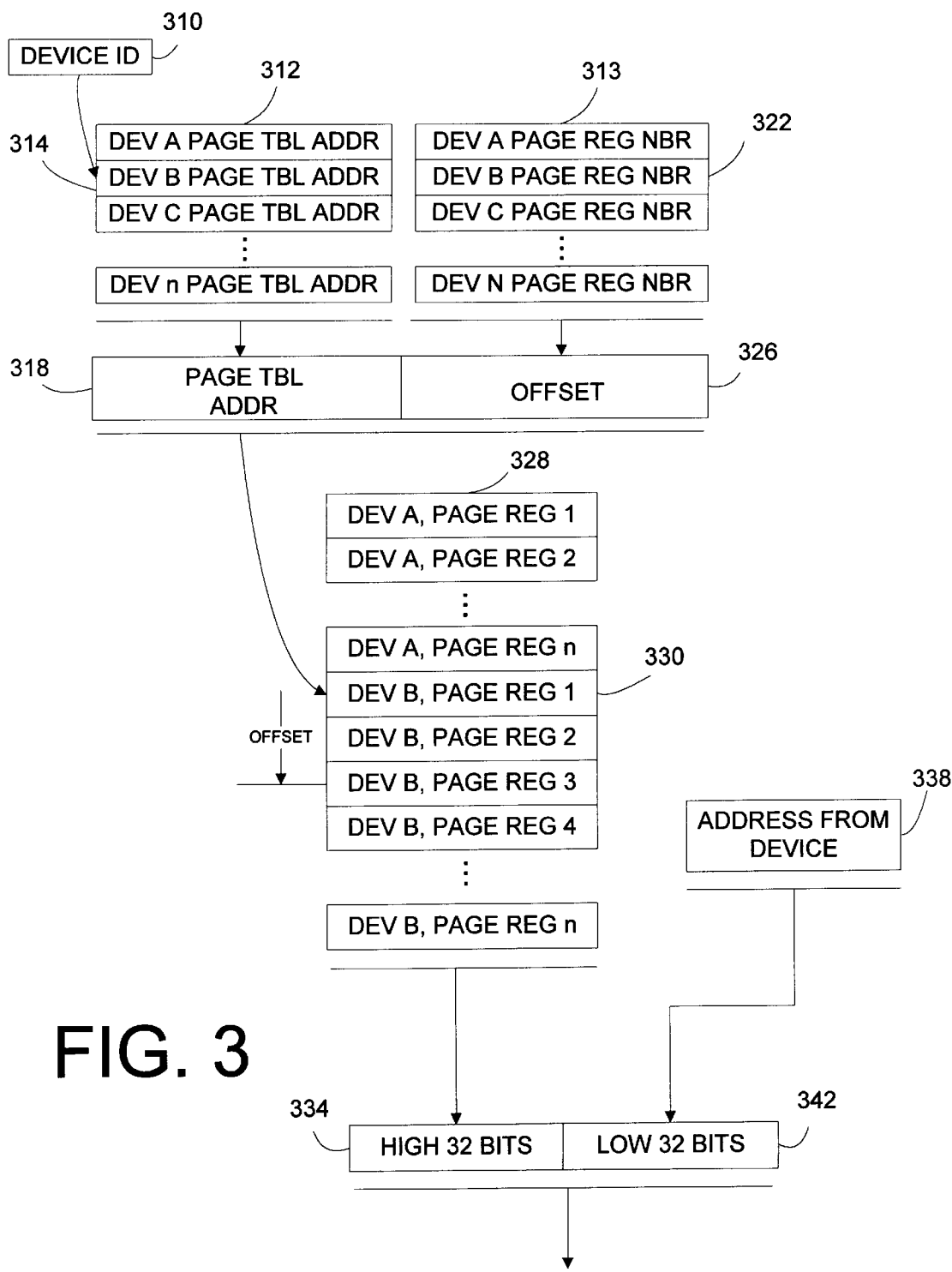
FIG. 3 is a block diagram showing an implementation of addressing structures embodying several aspects of the invention; and, FIG. 4 is a flow chart showing the overall flow of processing in a system utilizing the disclosed invention.

The operations represented by FIG. 3 are supported by well-known processing elements of bridge controller 210. Bridge controller 210 is programmed in accordance with the structures and steps to perform the address accessing and formation functions shown and described herein. The general concepts of address accessing and address formation are well-established processor functions, and will not be detailed here. FIG. 3 shows to one of ordinary skill a preferred embodiment of structures and operations necessary to carry out address translation in accordance with the present invention.

FIG. 3 is a block diagram showing processor upstream address translation by bridge 110. The primary structures shown in FIG. 3 are device page table addresses 312, device page number registers 313, and device page registers 328. These structures are independent structures and will vary according to the particular embodiment chosen for implementation. The structures may be located virtually anywhere in memory 222, bridge controller 210, arbiter 150, or a combination of these elements. Device page table addresses 312, device page number registers 313, and device page registers 328 may also be implemented as memory locations, registers, or a combination of both. In this way, the system can locate information at locations most convenient for developing the translations necessary for transferring information.

Page registers 328 may be implemented in several ways. There may be single or multiple page registers associated with each device.

As shown in FIG. 3, device ID 310 of the arbitration winner is used to access page table addresses 312 and page register numbers 313 associated with device ID 310. In the example shown in FIG. 3, device ID 310 accesses device B page table address 314 and device B page register number 322. The page table addresses 312 and page register numbers 313 can be redefined by any device given access to the locations.

For example, the locations may be changed by bridge controller 210, devices 138–142, devices 120–122, or various combinations of these devices. This would flexibly allow several system elements to define how information is to be transferred by defining the contents of these locations. In summary, the information used to access page registers 328 may be defined in a variety of ways by a variety of devices depending upon the particular implementation chosen.

The information from page table addresses 312 is then concatenated with offset 326 to form an address comprising a page table address 318 and an offset 326. This concatenated address is utilized to access a device page registers 328 associated with each device. In the particular embodiment shown in FIG. 3, page table address 318 points to device B page register 1 330, and then offset 326 is used to access page register number 3 of device B. This information is used as the high order 32 bits 334 for information sent to 64-bit bus 118. The low order 32 bits 342 come from the device itself as part of the transfer, as indicated by 338. Although FIG. 3 shows 32-bit high and low addresses being developed, the particular implementation is not limited to these bit lengths. High and low sections could be divided differently, and the overall bit length could be other than 64 bits. Each could, for example, be 16 bits for 32-bit to 32-bit translation.

Accessing page registers 328 could be implemented in several ways. Device ID 310 could be used to address page registers 328 directly, thus rendering page table addresses 312 and page register numbers 313 unnecessary. In this implementation there would be one page register for each device. If multiple page registers per device are used, sideband signals could be used to develop an offset to access a particular page register when several page registers are associated with a device.

Alternatively, to offer more flexibility in accessing page registers 328, a single table, such as 312, could be accessed by device ID 310. This location would then point directly to the desired page register of 328. This embodiment renders page register numbers 313 and offset 326 unnecessary. Page table addresses 312 could be used to define which of page registers 328 are accessed.

Page register number table 313 could also be implemented in a variety of ways. In the embodiment shown in FIG. 3, there is a unique page register number associated with each page table address. In this embodiment, both the page table address and page register number could be accessed at the same time by the device ID. Alternatively, page register numbers 313 could be separately accessible selected by signals other than the device ID. For example, a page register number from 313 could be chosen by sideband information. Alternatively, offset 326 could be developed directly from sideband signal information, thus eliminating the need for page register numbers 313.

Selection information for accessing device page registers 328 may also be developed in a variety other ways. For example, devices 138 could transfer information to bridge controller 210 via bus 134. Bridge controller 210 would then use this information in either changing or accessing the structures shown in FIG. 3.

The use of a series of device page table addresses allows the location of the page registers to be at any addressable location in memory. The page number registers are shown separately from the page table addresses because they are modifiable by the bridge controller, the device to which each is associated, or other elements of the system. This allows the bridge, devices or other elements to dynamically alter which page register associated with a particular device is to be used during a particular transfer. If only a single page register were used per device, there would be no need for the page register numbers which make up the offset 326. Finally, a preferred embodiment allows page registers 328 to also be modified by the bridge controller, the device to which each is associated, or other elements of the system.

When the primary bus is a PCI bus (e.g., bus 118), the bridge recognizes a page register value of 0x00000000 to indicate that only a 32-bit Single Address Cycle needs to be generated on the primary bus. When more than one page register per device is desired, an implementation-specific sideband signal may be used instead of Device I/O 310 to select among the page registers in the set of page registers assigned to the device.

A number of possible methods may be used to allow the secondary devices to configure the page registers residing in the bridge device. For example, with respect to the PCI Specification, 1) the page registers may reside within the PCI Configuration Space address range and are read from and written to by means of Configuration Reads and Writes; 2) the page registers may reside within the PCI Memory Space address range and are read from and written to by means of Memory Reads and Writes; 3) the page registers may reside within the PCI I/O Space address range, and are read from and written to by means of I/O Reads and Writes; or 4) the page registers may reside within a new address space and are read from and written to by means of new PCI commands to be defined.

Figure 4:
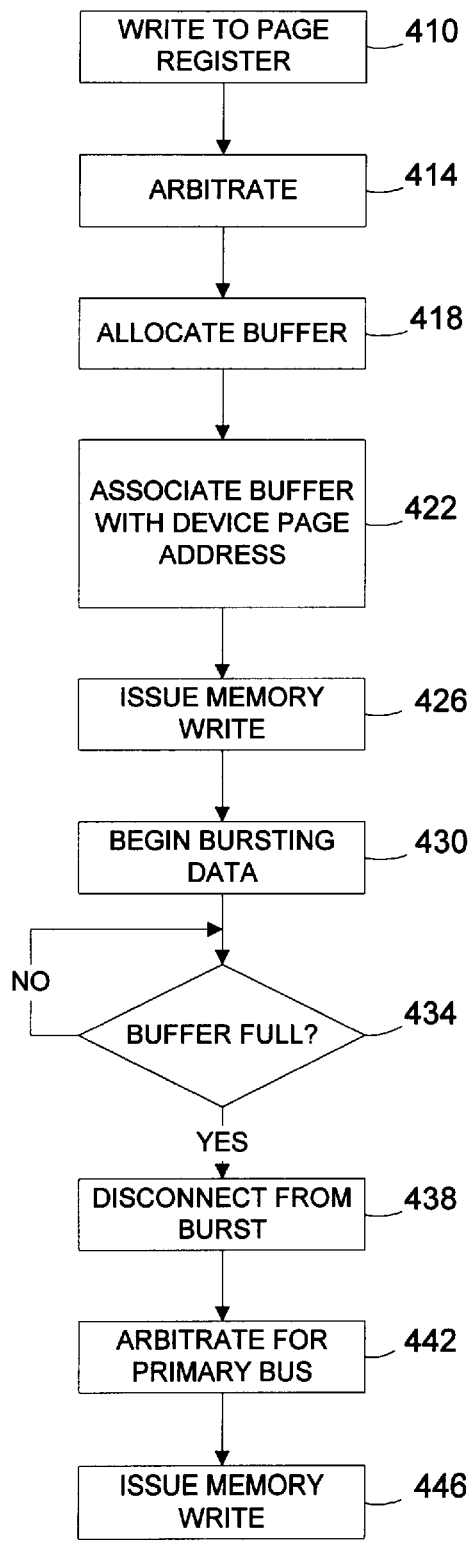

FIG. 4 is a flowchart showing address translation for a 32-bit-only master device residing on the secondary bus of a PCI bridge in accordance with the present invention. In this example, the page registers reside in configuration space.

First, the master device issues a configuration write to the page registers associated with the master device (step 410). For example, the master device writes to that register a value of 0xFEDCBA98, to set up further master accesses to use 0xFEDCBA98 as the upper 32 bits of address.

The master device then arbitrates for the secondary bus and receives a grant (step 414). The bridge device allocates a buffer for this transaction (step 418) and associates it with this master's page register (step 422).

The master device issues a PCI Memory Write command (step 426) and bursts data beginning, for example, at address 0x76543210 (step 430). The bridge accepts data until its buffer is full (step 454), and then disconnects from the burst (step 438). The bridge arbitrates for the primary bus (step 442), and issues a memory write beginning at the 64 bit address 0xFEDCBA9876543210 (step 446).

V. CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

It will be apparent to those skilled in the art that various modifications and variations can be made in the present invention and in construction of this bridge system without departing from the scope or spirit of the invention. For example, the two bus architecture of FIG. 1 is intended to be exemplary only. Other multiple bus architectures with bridges, having different arbitration schemes, could also be used. As an additional example, arbiters 130 and 150 could arbitrate using signals over buses 118 and 134, respectively. Alternatively, instead of buses 126 and 146, a dedicated common arbitration bus in parallel to all devices and the bridge could replace buses 126 and 146. Arbitration could also be carried out entirely by bridge 110 using either buses 118 or 134, or one or more dedicated arbitration buses for arbitration communications between bridge 110 and the devices on each bus.

The above principles could also be used in architectures which are not bus-to-bus transfers. For example, the above principles could be applied in an environment where device to device transfers are taking place directly between the devices.

We claim:

1. Apparatus for translating a final address for communication from devices having a first addressing capability to devices having a second addressing capability, comprising:
    means for accessing prestored address translation information using device identification information identifying one of said devices having a first addressing capability, wherein said means for accessing comprises means for selecting one of several prestored address information associated with said one device;
    means for receiving first address information from said one device; and
    means for creating a final address by combining said first address information with said prestored address translation information.

2. The apparatus according to claim 1, wherein said means for accessing prestored address translation information comprises:
    means for using arbitration information to access said prestored address information.

3. The apparatus according to claim 2, wherein said means for using arbitration information to access said prestored address information comprises:
    means for receiving arbitration information identifying said one device.

4. The apparatus according to claim 1, wherein said means for accessing prestored address translation information comprises:
    means for developing a pointer to said prestored address information.

5. The apparatus according to claim 4, wherein said means for developing comprises:
    means for accessing said pointer at a fixed memory location.

6. The apparatus according to claim 4, wherein said one device comprises:
    means for defining said address translation information.

7. The apparatus according to claim 6, wherein said one device comprises:
    means for providing sideband signal information used in accessing said address translation information.

8. The apparatus according to claim 6, wherein said means for defining said address translation information comprises:
    means for storing offset information.

9. The apparatus according to claim 1, said one device comprises:
    means for storing prestored address translation information.

10. A bridge for transferring information between a first bus and a second bus, comprising:
    means for storing partial address information used in transferring information;
    means for receiving device-identification information from a device coupled to the first bus;
    means for accessing said partial address information using said device-identification information;
    means for forming final address information from address information from the device and said accessed partial address information; and,
    means for transferring information using said final address information.

11. The system according to claim 10, wherein said bridge further comprises:
    an arbiter for receiving said device-identification information.

12. The system according to claim 10, wherein said means for accessing said partial address information further comprises:
    means for receiving sideband information from said device; and,
    means for utilizing said sideband information to access said partial information.

13. The system according to claim 10, wherein said bridge further comprises:
    memory means for storing page table addresses which provide locations of page registers associated with said device.

14. The system according to claim 10, wherein said bridge further comprises:
    memory means for storing device page register numbers which provide a location of a page register associated with the device.

15. The system according to claim 14, wherein said means for receiving device-identification information comprises:
    means for receiving device-identification information from an arbiter.

16. The system according to claim 14, wherein said means for receiving device-identification information comprises:
    means for receiving page register selection information.

17. A method for developing a final address for transferring information between a first device providing device-identification information and auxiliary address information and a second device, comprising the steps of:
    accessing partial address information using the device-identification information from the first device to select from one of several prestored address information associated with said first device; and
    forming a final address using the accessed partial address information and auxiliary address information from said device.

18. The method of claim 17, further comprising the step of:

receiving the device-identification information from an arbiter.

19. The method of claim 17, further comprising the step of:

receiving the device-identification information from a dedicated bus.

20. The method according to claim 17, wherein the step of accessing said partial address information comprises the substep of:

accessing a page table address using said device-identification information.

21. The method according to claim 17, wherein the step of accessing said partial address information comprises the substep of:

accessing a page register number using said device-identification information.

22. The method according to claim 17, wherein the step of accessing said partial address information comprises the substep of:

accessing a page register number using page register number selection information from said device.

23. The method according to claim 17, wherein said further information is received as part of a data transfer from said device.

24. A system for transferring information between a first bus having a first width and a second bus having a width greater than the first width, comprising:

a first device connected to said first bus for transferring information to a second device connected to said second bus;

a partial address information retrieval element for receiving device identification information identifying said first device connected to said first bus, and retrieving partial address information based on said device identification information;

an address translation element for receiving an initial address from said first device and-forming a final address from said initial address and said partial address information; and a data communication element for transmitting information from said first device to said second device using said final address.

25. The system according to claim 24, further comprising:

an arbitration element for determining an arbitration winner and outputting said device identification information to identify an arbitration winner.

26. The system according to claim 24, wherein said partial address information retrieval element comprises:

a page table pointer retrieval element for retrieving a pointer from a page table using said device identification information.

27. The system according to claim 24, wherein said partial address information retrieval element comprises:

a page table pointer retrieval element for retrieving a pointer and offset information from a page table using said device identification information, and using said pointer and offset information to retrieve said partial address information.

28. The system according to claim 24, further comprising:

a sideband signal receiver element for receiving sideband signal information from said first device and using said sideband signal information to retrieve said partial address information.

29. Apparatus for translating addresses for communication from devices having a first addressing capability to devices having a second addressing capability, comprising:

a memory for storing prestored address translation information;

an accessing element for accessing said prestored address translation information using device identification information which identifies one of said devices having said first addressing capability, said accessing element comprising a selecting element for selecting one of several prestored address information associated with said one device; and an address translating element for creating a final address by combining a first address from a device associated with said identification information and said prestored address translation information.

30. The apparatus according to claim 29, wherein said accessing element comprises:

an arbitration information element for using arbitration information to access said prestored address information.

31. The apparatus according to claim 30, wherein said arbitration information element comprises:

an arbitration identification receiving element for receiving arbitration information identifying said one device.

32. The apparatus according to claim 29, wherein said accessing element comprises:

a pointer accessing element for accessing a pointer to said prestored address information using said device identification information.

33. The apparatus according to claim 29, wherein said one device comprises:

a sideband signal information generation element for generating sideband signal information used in accessing said address translation information.

34. The apparatus according to claim 29, said one device comprises:

an address translation information generating element for storing prestored address translation information in said memory.

35. A method for transferring information between a first bus and a second bus, comprising:

receiving device-identification information from a device coupled to the first bus;

accessing partial address information using said device-identification information;

forming final address information from address information from the device and said accessed partial address information; and transferring information using said final address information.

36. The method according to claim 35, further comprising the step of:

storing page table addresses which provide locations of page registers associated with said device.

37. The method according to claim 35, further comprising the step of:

storing device page register numbers which provide a location of a page register associated with the device.

38. The method according to claim 35, wherein the step of accessing comprises selecting from one of several prestored address information associated with said device.

* * * * *